(12) United States Patent
Wright

(10) Patent No.: US 11,605,309 B1
(45) Date of Patent: Mar. 14, 2023

(54) EDUCATIONAL TOOL AND METHOD OF USING SAME

(71) Applicant: Christina Wright, South Orange, NJ (US)

(72) Inventor: Christina Wright, South Orange, NJ (US)

( * ) Notice: Subject to any disclaimer, the term of this patent is extended or adjusted under 35 U.S.C. 154(b) by 498 days.

(21) Appl. No.: 16/881,646

(22) Filed: May 22, 2020

Related U.S. Application Data

(60) Provisional application No. 62/857,651, filed on Jun. 5, 2019.

(51) Int. Cl.
*G09B 23/24* (2006.01)
*G09B 23/02* (2006.01)

(52) U.S. Cl.
CPC .............. *G09B 23/24* (2013.01); *G09B 23/02* (2013.01)

(58) Field of Classification Search
CPC ... G09B 1/14; G09B 1/28; G09B 3/00; G09B 3/08; G09B 23/24
USPC .......................... 434/327, 334, 345, 348, 364
See application file for complete search history.

(56) References Cited

U.S. PATENT DOCUMENTS

| | | | |
|---|---|---|---|
| 1,343,095 A * | 6/1920 | Smith ....................... | G09B 3/02 434/167 |
| 2,142,419 A * | 1/1939 | Strongman .............. | G09B 3/08 434/361 |
| 2,891,322 A | 6/1959 | Brownlee | |
| 3,724,098 A | 4/1973 | McSmith | |
| 4,199,876 A | 4/1980 | Katz | |
| D266,129 S | 9/1982 | Lidstrom | |
| 4,654,989 A * | 4/1987 | Fleming .................... | G09F 7/02 40/579 |
| D371,162 S | 6/1996 | Poudel | |
| 5,796,620 A * | 8/1998 | Laskowski ......... | G05B 19/4207 700/118 |

(Continued)

FOREIGN PATENT DOCUMENTS

| | | |
|---|---|---|
| CN | 203232632 U | 10/2013 |
| CN | 204117492 U | 1/2015 |

(Continued)

OTHER PUBLICATIONS

Anonymous, Science Paper Model—3D Periodic Table Free Papercraft Download, http://www.papercraftsquare.com/science-paper-model-3d-periodic-table-free-papercraft-download.html, Accessed Feb. 13, 2019.

(Continued)

*Primary Examiner* — Kurt Fernstrom
(74) *Attorney, Agent, or Firm* — Werschulz Patent Law, LLC; Patricia P. Werschulz, Esq.

(57) ABSTRACT

A three-dimensional educational tool that demonstrates periodicity in science and mathematics and a method of using same. The educational tool has a frame with a top template, such as the periodic table of the chemical elements, having a plurality of openings and a plurality of members, representing chemical elements as an example embodiment disposed in the openings. The educational tool provides a plurality of trend blocks that rapidly change a three dimensions display of a plurality of members by selectively raising or lowering the members to demonstrate a particular characteristic of a member in relationship to another member. The trend blocks sit under the frame and the members slide up and down accordingly.

3 Claims, 9 Drawing Sheets

(56) References Cited

U.S. PATENT DOCUMENTS

| | | | |
|---|---|---|---|
| 6,633,416 B1* | 10/2003 | Benson | G06F 3/002 |
| | | | 358/478 |
| D538,856 S | 3/2007 | Bradford | |
| 7,297,000 B1 | 11/2007 | Bernard | |
| 7,654,021 B2* | 2/2010 | Kleyman | G01B 5/207 |
| | | | 33/561.1 |
| 7,938,646 B2 | 5/2011 | Aldersley | |
| D752,684 S | 3/2016 | Lanza | |
| D809,597 S | 2/2018 | Kalia et al. | |
| 10,471,617 B2* | 11/2019 | Volzer | B26D 1/0006 |
| 2009/0081625 A1* | 3/2009 | Baerg | G09B 1/14 |
| | | | 434/209 |
| 2018/0243644 A1* | 8/2018 | Konkapaka | G09B 1/02 |

FOREIGN PATENT DOCUMENTS

| | | |
|---|---|---|
| CN | 206224900 U | 6/2017 |
| CN | 304427334 S | 12/2017 |
| GB | 3005915 | 8/2002 |
| KR | 300736339 | 3/2014 |
| KR | 300870913 | 9/2016 |
| RU | 30043320 | 3/1997 |

OTHER PUBLICATIONS

Ghosh, Abhik et al., The Grammar of the Elements, American Scientist, Nov.-Dec. 2019, vol. 107, No. 6, p350https://www.americanscientist.org/article/the-grammar-of-the-elements.
Leach, Mark, Database of Periodic Tables, Chemogenesis, 1980 https://www.meta-synthesis.com/webbook/35_pt/pt_database.php?Button=3D+Formulations#top; https://www.meta-synthesis.com/webbook/35_pt/pt_database.php?textfield=Gary+katz#top.
Roberts, Siobhan, Is It Time to Upend the Periodic Table?, The New York Times, Aug. 27, 2019, Section D, p. 3, https://www.nytimes.com/2019/08/27/science/periodic-table-elements-chemistry.html.
Scerri, Eric, The Periodic Table at 150, American Scientist, Oct. 14, 2019 https://www.americanscientist.org/blog/macroscope/the-periodic-table-at-150.

* cited by examiner

EDUCATIONAL TOOL AND METHOD OF USING SAME

CROSS-REFERENCE TO RELATED APPLICATIONS

This application is a nonprovisional utility application of the provisional patent application, Ser. No. 62/857,651, filed in the United States Patent Office on Jun. 5, 2019, and claims the priority thereof and is expressly incorporated herein by reference in its entirety.

TECHNICAL FIELD

The present disclosure relates generally to an educational tool. More particularly, the present disclosure relates to a three-dimensional educational tool that demonstrates periodicity in science and mathematics and a method of using same.

BACKGROUND

Teachers know that not all students learn in the same way and that some students learn better by reading, some by listening and some by doing. In particular, laboratory experiences are often an important component in science education because it engages the students in reading the text, listening to instructions and doing, by physically manipulating something. Teachers are wise to present important concepts in a variety of ways in order to reach the most students.

An important concept when learning chemistry at a beginning level is understanding the periodic table. The periodic table mostly widely use is based on the one developed by Mendeleev, published in 1869 and perfected later by others. When the table was first published, many chemical elements had not been isolated or identified. Mendeleev deliberately left gaps where he believed the missing chemical elements should be in the table and predicted many characteristics that those missing chemical elements would have. Experiments proved these predictions to be true. While some lanthanoid and actinoid chemical elements isolated in the late twentieth and early twenty-first centuries do not completely follow predictions due to relativistic effects, many do.

The value of displaying the chemical elements in this manner is the ability to predict chemical elemental properties. Others have looked at the periodicity of the chemical elemental properties and have used alternate formats to show these relationships graphically. These generally have esoteric purposes and can be rather opaque to anyone but the most knowledgeable. Many have translated these formats into three-dimensional shapes such as spirals and pyramids. These shapes are not modifiable for demonstration purposes and illustrate limited attributes of the chemical elements.

While these units may be suitable for the particular purpose employed, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a tool for a teacher to explain periodicity. Accordingly, the present disclosure provides an educational tool that demonstrates periodicity in three dimensions.

Another aspect of an example embodiment in the present disclosure is to provide an educational tool that rapidly displays a plurality of periodic properties. Accordingly, the present disclosure provides a plurality of trend blocks that rapidly change a three dimensions display of a plurality of members.

A further aspect of an example embodiment in the present disclosure is to provide a method for teaching periodicity using an educational tool. Accordingly, the present disclosure provides a three-dimensional educational tool and a method of using same that allows a teacher to rapidly change an appearance of the three-dimensional educational tool by changing a first trend block to a second trend block, showing different periodic trends.

Accordingly, the present disclosure describes a three-dimensional educational tool that demonstrates periodicity in science and mathematics and a method of using same. The educational tool has a frame with a top template, such as the periodic table of the chemical elements, having a plurality of openings and a plurality of members, such as representing chemical elements disposed in the openings. The educational tool provides a plurality of trend blocks that rapidly change a three dimensions display of a plurality of members by selectively raising or lowering the members to demonstrate a particular characteristic of a member in relationship to another member. The trend blocks sit under the frame and the members slide up and down accordingly.

The present disclosure addresses at least one of the disadvantages described previously. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
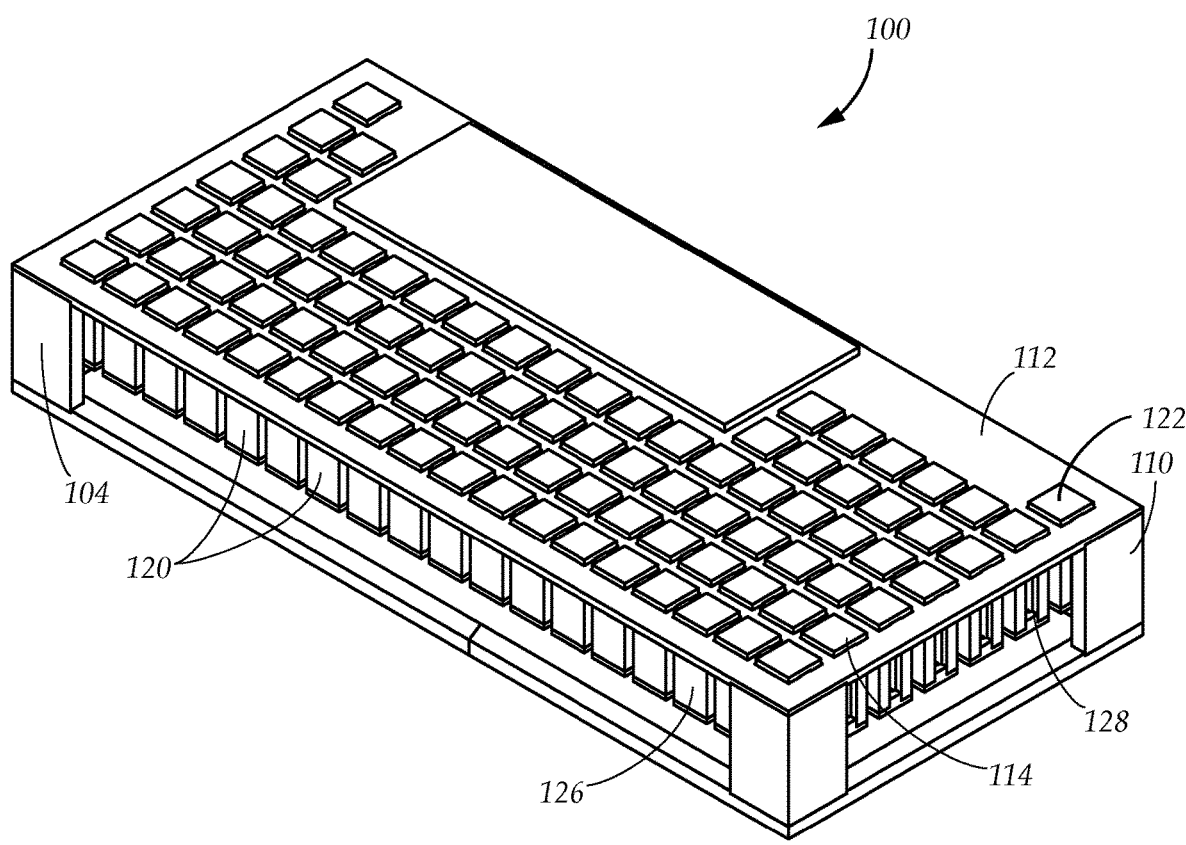
FIG. 1 is a perspective view of an example embodiment of an educational tool for demonstrating periodicity.
Figure 2:
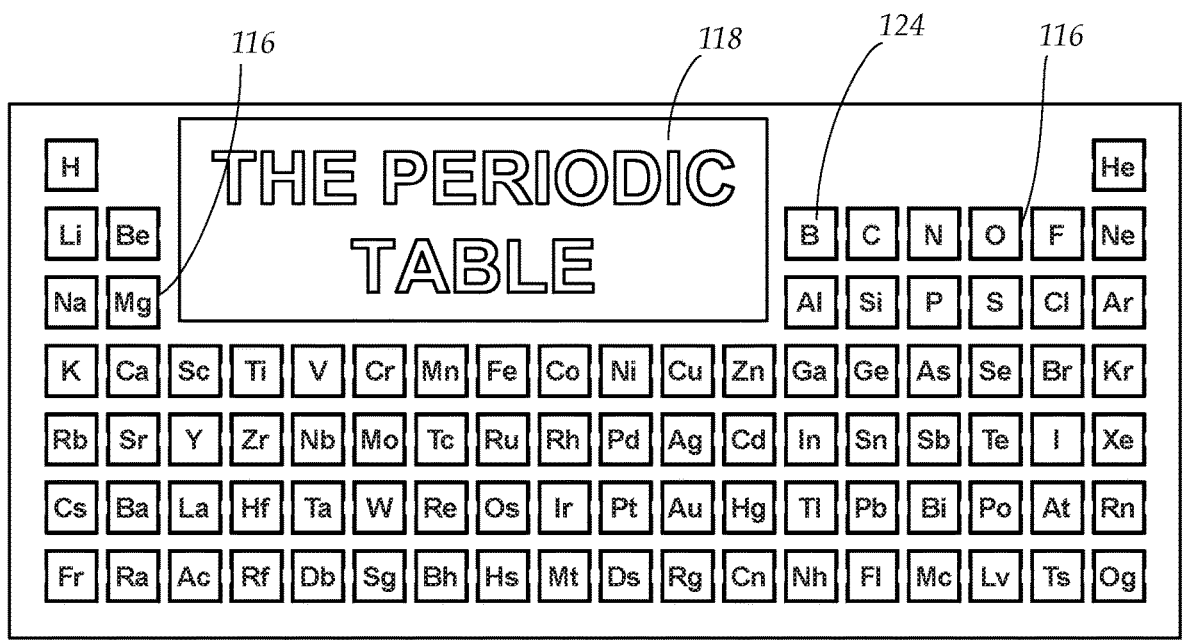
FIG. 2 is a top plan view of the example embodiment of the educational tool for demonstrating periodicity.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

FIGS. 1-4 illustrate an example embodiment of an educational tool 100 for demonstrating periodicity in science and mathematics. In the present disclosure, the FIGURES demonstrate the usefulness of the educational tool 100 for teaching on the subject of a chemical periodic table 118 but a person of ordinary skill in the art understands that this educational tool can be constructed to demonstrate other scientific fields of study and mathematical concepts that are used in calculus, statistics, economics and other related disciplines.

The educational tool 100 has a frame 110. The frame 110 is defined by a top, a bottom and a plurality of sides that are connected by a plurality of posts 104. The frame 110 defines a volume therein. In the illustration, the frame 110 is a rectangular cuboid, and said shape is not a limitation and other shapes are possible within the inventive concept.

A top template 112 is disposed atop the frame 110. The top template 112 is defined by what is to be demonstrated within a plane defined by an "x" axis and a "y" axis. In the illustrations, the plane illustrates a chemical periodic table, but as disclosed herein, other concepts are possible.

The top template 112 has a plurality of openings 114. Each opening 114 has at least one protrusion 116 on a side.

Within the openings 114 is disposed a plurality of members 120, illustrating values along a "z" axis. Each member has a top surface 122 atop a support pillar 126. The top surface may be inscribed or have a decal 124 identifying the member 120. Each support pillar 126 has a groove 128 that cooperates with the at least one protrusion 116 of the opening 114 in the top template 112 where the individual member 120 is disposed. The groove 128 of the support pillar 126 maintains the member 120 within the opening 114, allowing to slide when raised and lowered as explained hereinbelow.

Figure 3:
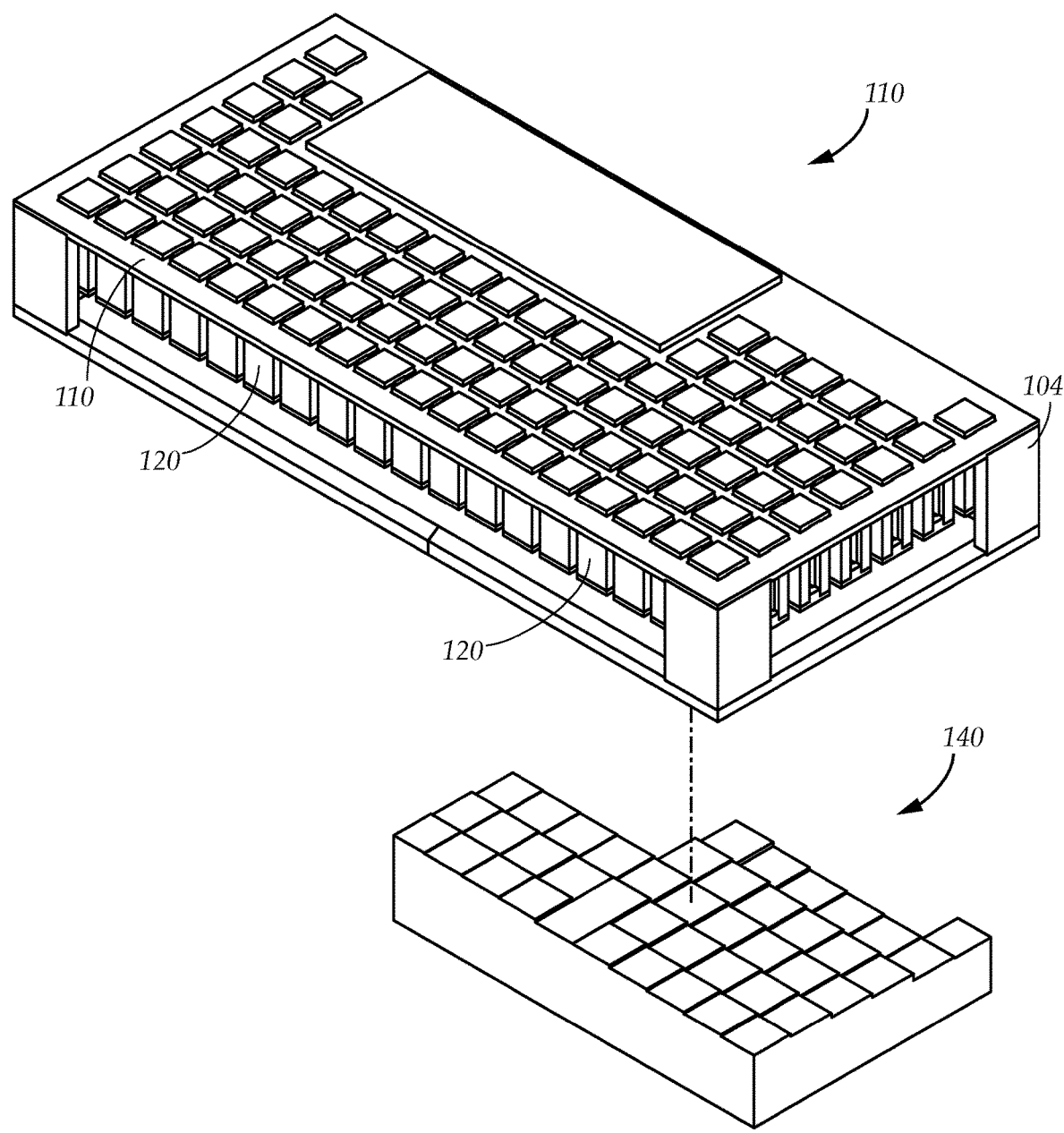
FIG. 3 is a perspective view of the example embodiment of the educational tool having a trend block being placed under a frame holding a plurality of members.
Figure 4:
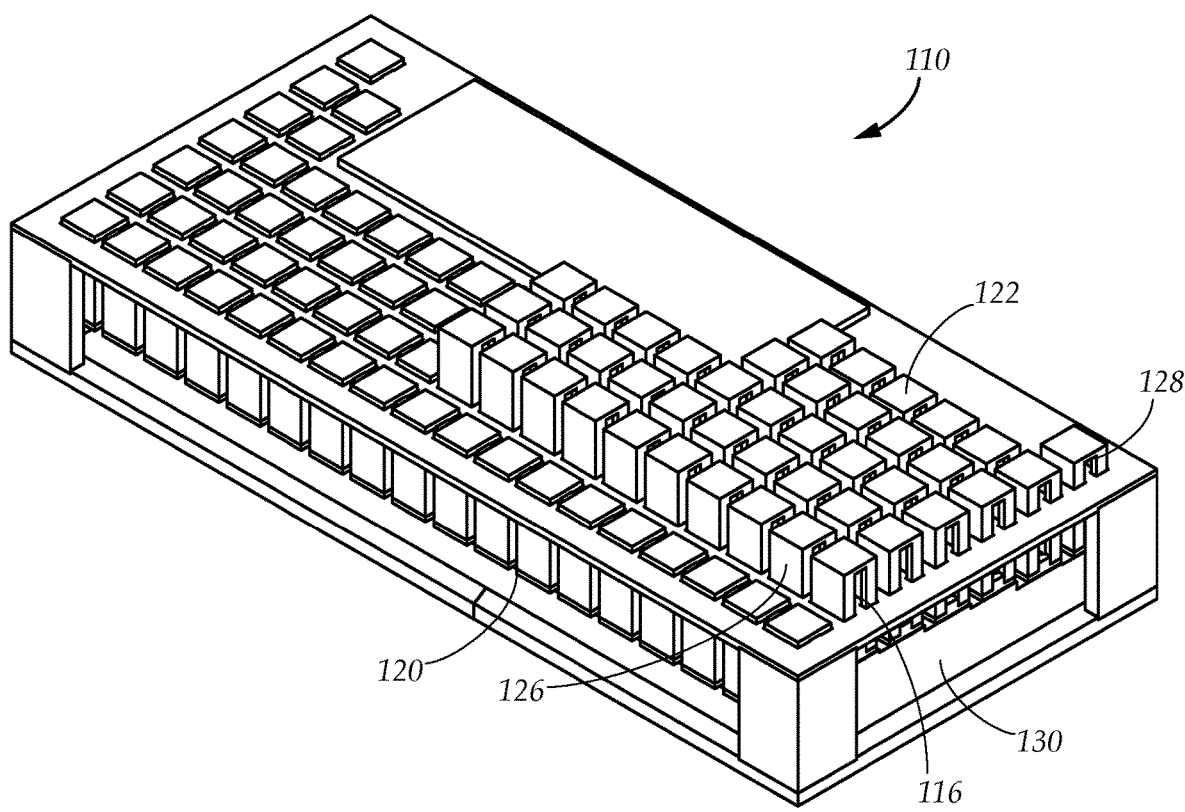
FIG. 4 is a perspective view of a change in appearance of the example embodiment of the educational tool after the trend block is under the frame.
Figure 5:
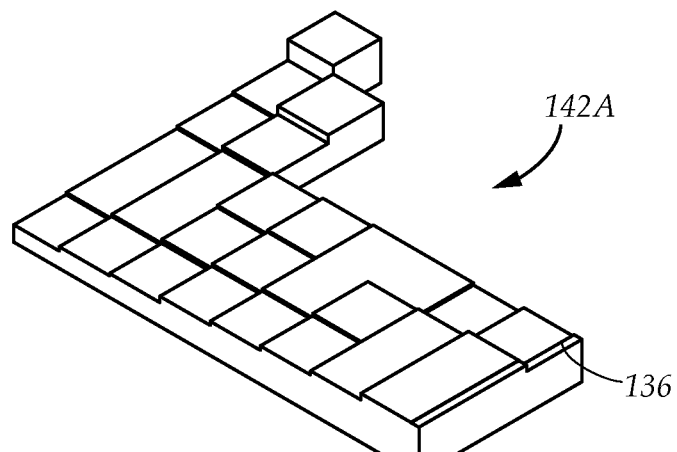
FIG. 5 is a perspective view of an example embodiment of a first partial trend portion of the educational tool.
Figure 6:
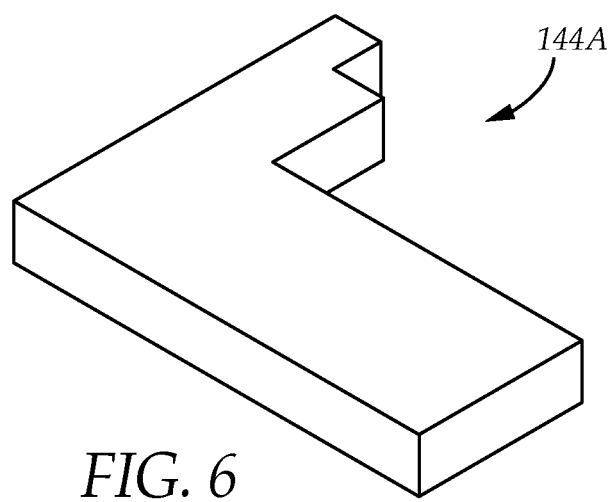
FIG. 6 is a perspective view of an example embodiment of a first partial platform of the educational tool.
Figure 7:
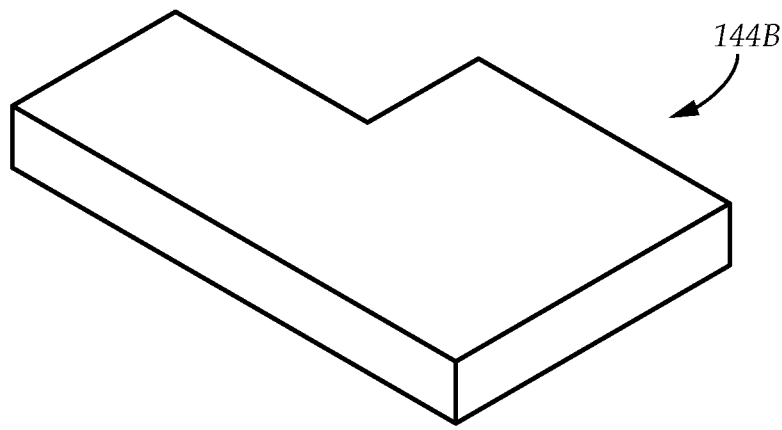
FIG. 7 is a perspective view of an example embodiment of a second partial trend portion of the educational tool.
Figure 8:
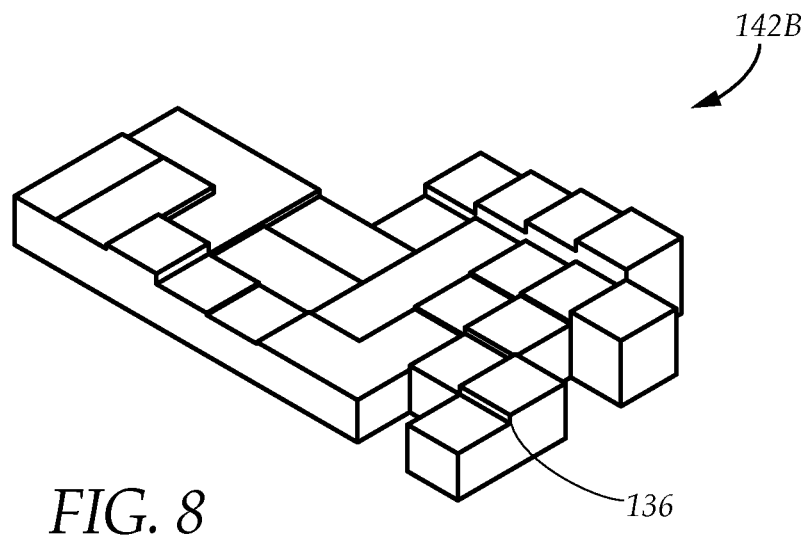
FIG. 8 is a perspective view of an example embodiment of a second partial platform of the educational tool.
Figure 9:
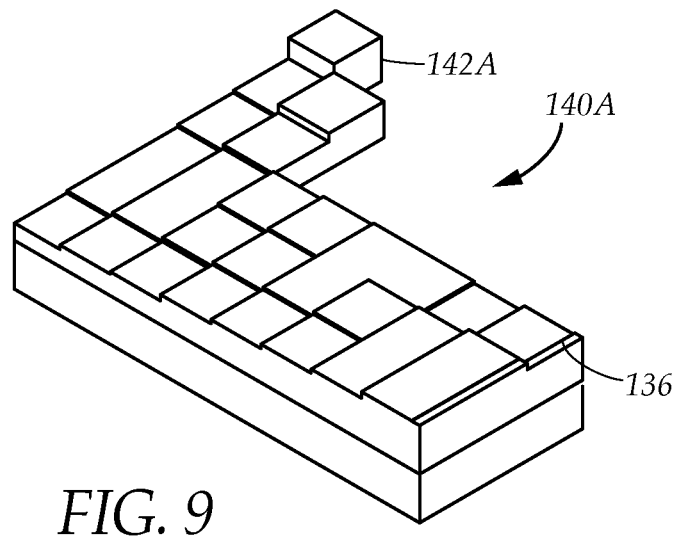
FIG. 9 is a perspective view of an example embodiment of a first partial trend block of the educational tool.
Figure 11:
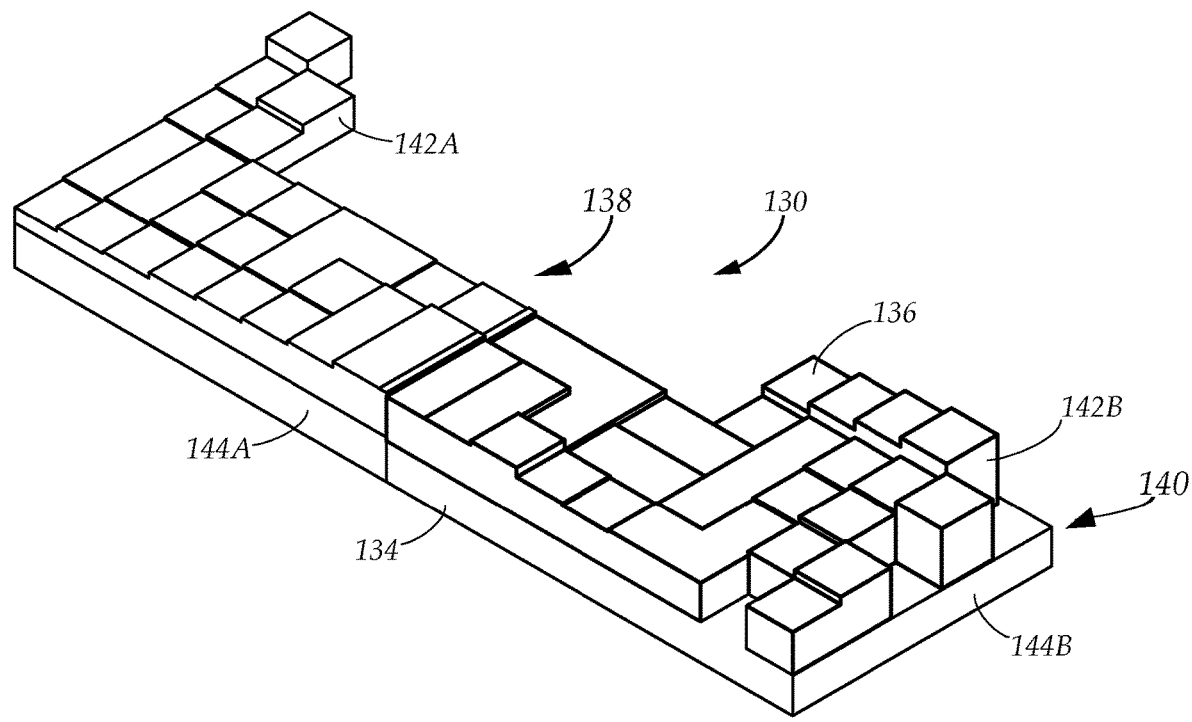
FIG. 11 is a perspective view of an example embodiment of a trend block of the educational tool demonstrating periodicity of electronegativity in a plurality of chemical elements.

The educational tool has a trend block 130 as shown in FIG. 11 or a partial trend block shown in FIGS. 3 and 4. The trend block 130 and the partial trend block 140 each has a non-uniform top surface 136 representing a trend for demonstration. The trend block 130 or the partial trend block 140 is disposed under the plurality of members 120, elevating said members upwardly through the plurality of openings 114 in the top template 112 disposed atop the frame 110.

Figure 10:
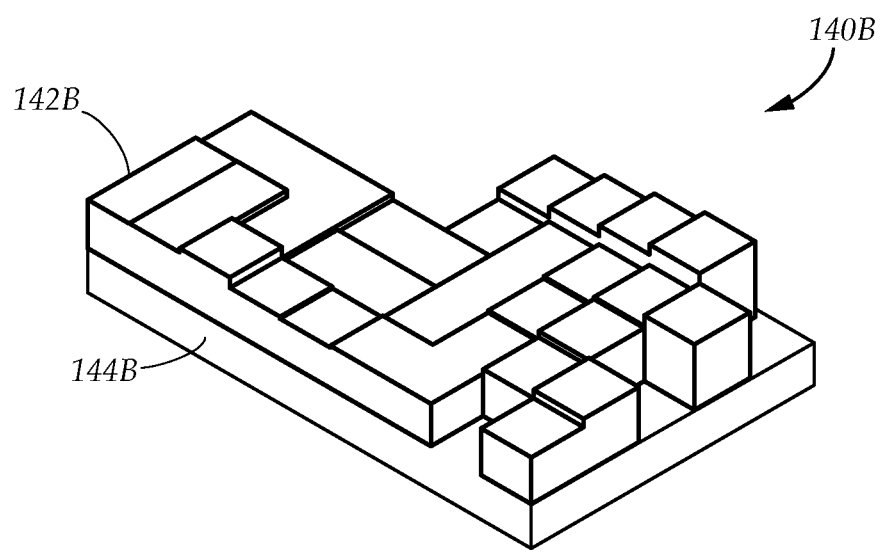
FIG. 10 is a perspective view of an example embodiment of a second partial trend block of the educational tool.

In FIG. 11, the trend block 130, demonstrating the periodicity of electronegativity in a plurality of chemical elements, further comprises a platform 134 that sits under the non-uniform top surface 136. The trend block 130 can be formed from a unitary piece having a non-uniform top surface 136 and a platform 134 below the non-uniform surface. Alternatively, the trend block 130 can have at least one partial trend block as explained herein below and be combined with another at least one other partial trend block 140 to form a trend block assembly 138. In the example embodiment demonstrating a chemical periodic table, an instructor may wish to focus on a specific portion of the chemical periodic table, such as the chemical elements that have a "d" orbital outer shell of electrons, and can use the partial trend block 140b shown in FIG. 10.

FIGS. 5-10 demonstrate the partial trend block 140A, 140B. The trend block 140A, 140B, further comprises at least one partial trend portion 142A, 142B having the non-uniform top surface 136 atop at least one platform 144A, 144B.

Figure 12:
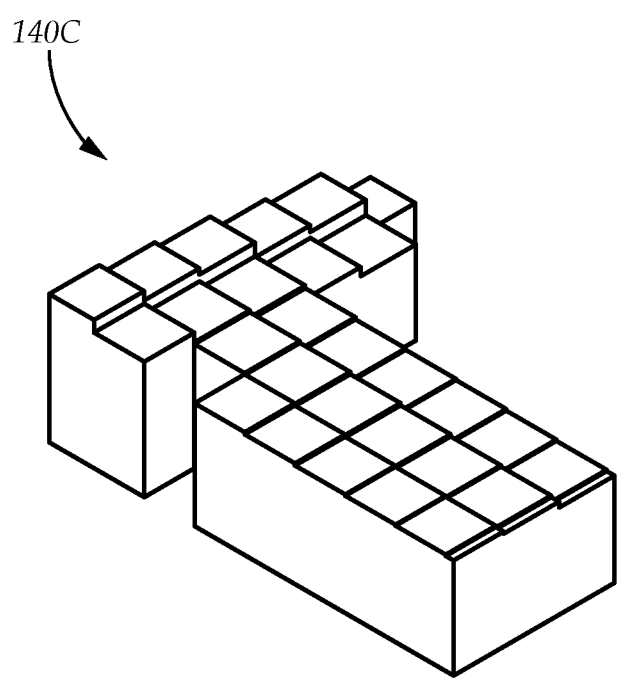
FIG. 12 is a perspective view of an example embodiment of a partial trend block of the educational tool demonstrating periodicity of atomic radii in a plurality of chemical elements.

Alternatively, the partial trend block 140C in FIG. 12, demonstrating the periodicity of atomic radii in a plurality of chemical elements, is a unitary piece with the non-uniform top surface.

The FIGURES demonstrate several characteristics of chemical elements, but these are not a limitation and a trend block can be formed to represent characteristics such as, but not limited to, valency, oxidation state, melting point, boiling point, ionization energy, electron affinity or atomic mass. Each member 120 is disposed in an opening 114 corresponding to a position of the chemical element in the chemical periodic table. The non-uniform surface 136 of the trend block 130 corresponds to a physical property associated with a chemical element displayed in a relative manner.

Further, the usefulness of the educational tool can be extended to other disciplines that rely on mathematical concepts. For example, three dimensional bar graphs are easily demonstrated using this tool with a different top template and trend blocks. In calculus, an integral of a function along the x-y axis can be shown by a trend block raising the members to approximate the area under the curve as the value of x changes.

FIGS. 1-11 demonstrate a method of using an educational tool. The instructor provides the frame 110 having the top template 112. The instructor chooses the appropriate top template 112 for the subject matter, allowing the frame 110 to be useful for different subject matter. The top template 112 has with the plurality of openings 114. The instructor disposes the plurality of members 120 within the openings 114 of the top template 112 and places the trend block 130 below the frame 110, the trend block 130 having the non-uniform top surface 136. The non-uniform top surface 136 lifts the plurality of members 120 upwardly through the plurality of openings 114 in the top template 112 of the frame 110, disposing the plurality of members 120 in a replication of the non-uniform top surface 136 of the trend block 130, the non-uniform top surface of the trend block representing a trend for demonstration in three dimensions, such as the electronegativity of chemical elements as it relates to their place on a chemical periodic table.

Before the instructor demonstrates a trend, the instructor must first choose a trend to demonstrate before proceeding and fabricate at least one trend block 130 having a non-uniform top surface 136 that demonstrates the chosen trend.

It is understood by people of ordinary skill in the art that the trend block 130 can be fabricated as a unitary piece, into partial trend blocks 140A, 140B or as by placing the trend portion 132 atop the platform 134 as described hereinabove. The trend block 130 can be fashioned by carving, molding or by 3-D printing and the method of fabrication is not a limitation.

The step of fabricating the trend block 130 includes fabricating the partial trend portion 142 and fabricating a partial platform 144 and placing the partial trend portion 142 atop the partial platform 144.

The instructor may choose to demonstrate a limited area of periodicity by placing at least one partial trend block 140A, 140B below the frame 110, as shown in the example embodiment of the chemical periodic table, focusing on the chemical elements that have electrons in a particular outer shell.

In the discussion hereinabove, the term "chemical element" is understood to mean, " . . . each of more than one hundred substances that cannot be chemically interconverted or broken down into simpler substances and are primary constituents of matter and is distinguished by its atomic number."

The term "chemical periodic table" refers to "a tabular arrangement of the chemical elements, ordered by their atomic number, electron configurations, and recurring chemical properties, whose structure shows periodic trends."

When the term "element" is used without modification, it is understood to mean, "a component, constituent, part, section, portion, piece, segment, feature, facet, ingredient, unit, module or item."

It is understood that when an element is referred hereinabove as being "on" or "atop" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a three-dimensional educational tool that demonstrates periodicity in science and mathematics and a method of using same. The disclosure is illustrated by example in the drawing figures, and throughout the written description. It should be understood that numerous variations are possible, while adhering to the inventive concept. Such variations are contemplated as being a part of the present disclosure.

What is claimed is:

1. An educational tool for demonstrating periodicity in three dimensions, comprising:
    a frame;
    a top template having a plurality of openings in a form of a chemical periodic table, said plurality of openings having at least one protrusion, the top template sitting atop the frame;
    a plurality of members disposed within the plurality of openings of the top template, said members each have a support pillar and a top surface atop the support pillar, said support pillars each have at least one groove, the at least one protrusion on said plurality of openings of the top template sliding within the at least one groove of the support pillar maintaining the plurality of members within the openings; and
    at least one trend block, the at least one trend block disposed under said plurality of members, the at least one trend block having a non-uniform top surface representing a trend for demonstration, the at least one trend block disposed under said plurality of members, elevating said plurality of members upwardly through said plurality of openings in the top template disposed atop the frame, wherein the trend block further comprises a trend portion having the non-uniform top surface and a platform, the trend portion disposed on the platform, wherein the trend block further comprises at least one partial trend portion having the non-uniform top surface and at least one platform, wherein the trend block is an assembly having a plurality of trend portions and a plurality of platforms.

2. The educational tool as described in claim 1, wherein each of the plurality of members represents a different chemical element, each member placed in an opening corresponding to a position of the chemical element in the chemical periodic table.

3. The educational tool as described in claim 2, wherein the non-uniform surface of the trend block corresponds to a physical property associated with the chemical element.

* * * * *